Dec. 22, 1959 M. CAMRAS 2,918,537

APPARATUS FOR MAKING DUPLICATE MAGNETIC RECORDS

Original Filed Nov. 5, 1948 3 Sheets-Sheet 1

Inventor:
Marvin Camras
by Hill, Sherman, Meroni, Gross & Simpson Attys

APPARATUS FOR MAKING DUPLICATE MAGNETIC RECORDS

Original Filed Nov. 5, 1948 3 Sheets-Sheet 2

Inventor:
Marvin Camras by Hill, Sherman, Meroni, Gross & Simpson Attys

Inventor:
Marvin Camras
by Hill, Sherman, Meroni, Gross & Simpson Attys

United States Patent Office 2,918,537
Patented Dec. 22, 1959

2,918,537

APPARATUS FOR MAKING DUPLICATE MAGNETIC RECORDS

Marvin Camras, Glencoe, Ill., assignor to Armour Research Foundation of Illinois Institute of Technology, Chicago, Ill., a corporation of Illinois

Original application November 5, 1948, Serial No. 58,403, now Patent No. 2,747,027, dated May 22, 1956. Divided and application June 2, 1951, Serial No. 229,619, now Patent No. 2,795,651, dated June 11, 1957. Again divided and this application March 26, 1957, Serial No. 648,589

20 Claims. (Cl. 179—100.2)

This invention relates to record duplicating apparatus, and more particularly, to apparatus for producing duplicate records from a master magnetic recording.

In one method of magnetic recording, a lengthy magnetizable record medium is drawn across an electromagnetic transducer head assembly at substantially uniform linear velocity. The head assembly includes a magnetic core member having a non-magnetic gap over which the medium passes and which is provided with suitable current conducting exciting elements in the form of coils to produce a magnetic field across the gap.

During the recording operation, current is caused to flow in exciting elements in accordance with time variations of an intelligence to produce a time varying magnetic field in the core in accordance with the value thereof. The lengthy magnetizable medium is subjected to the influence of this field as it is drawn therethrough, and magnetization is imparted to incremental lengths of the medium in accordance with time variations of the intelligence, thus causing variations in the magnetization of the medium along its length in accordance with the time variations of the intelligence.

Depending on the arrangement and construction of the exciting element, various magnetic fields may be produced which are identified, respectively, as longitudinal fields, transverse fields or vertical fields. The distinction in these different types of magnetic fields lies, of course, in the direction taken by the magnetic lines of force with respect to the dimensional axis of the magnetic recording medium.

During reproduction, the lengthy magnetizable medium is drawn across the same or similar head assembly to set up a flux in the core portion thereof in accordance with the magnetization of the medium along successive incremental lengths as it passes across the gap of the magnetic core member. The resultant time-varying flux induces voltage in the coils with which the flux is linked in accordance with the time rate of change thereof. This voltage may be amplified and suitably reproduced by a loudspeaker or similar device to reproduce the intelligence recorded.

A duplicating device constructed in accordance with my invention utilizes the characteristics of a magnetizable medium which has been suitably magnetized in accordance with the time variations of a given intelligence, to influence a duplicate magnetizable medium thereby imparting a similar magnetization to the duplicate medium. This, therefore, constitutes one object of my invention.

Another object of my invention is to provide novel apparatus in which a magnetizable record member is brought into contact with a magnetized master record.

A further object of the present invention is to provide novel apparatus for transferring a magnetic pattern present on a master magnetic record to a magnetizable record blank.

Still another object of the present invention is to provide novel apparatus for producing magnetic sound record duplicates from a master magnetic sound recording by a contact process.

Still another object of the present invention is to provide apparatus in which a magnetized pattern on a relatively high coercive force material is transferred by a contact process to a duplicate lower coercive force record member.

Still another and further object of the present invention is to provide novel means for duplicating a magnetic record on a novel master record member.

Other features and objects which I believe to be characteristic of my invention are set forth with particularity in the appended claims. My invention itself, however, both as to its organization, and manner of construction, together with further objects and advantages thereof, may best be understood by reference to the following description taken in connection with the accompanying drawings, in which:

This application is a division of my copending application for "Apparatus for Making Duplicate Magnetic Records" filed June 2, 1951, U.S. Serial 229,619, which in turn is a division of my application for "Recording Apparatus and Method for Making Duplicate Magnetic Records," U.S. Serial No. 58,403, filed November 5, 1948, both assigned to the same assignee as the present invention.

My invention is illustrated and is herewith explained in connection with a lengthy magnetizable medium taking the form of a tape-like record, however, the magnetic pattern appearing on any given form of magnetic record may comprise any number of tracks being in the same or in opposite directions. It will, of course, be understood that the principles of my invention are equally applicable to magnetizable records of various shapes and configurations bearing any conceivable magnetic pattern and the disclosures herein set forth are by way of illustrating preferred examples only.

Figure 1:
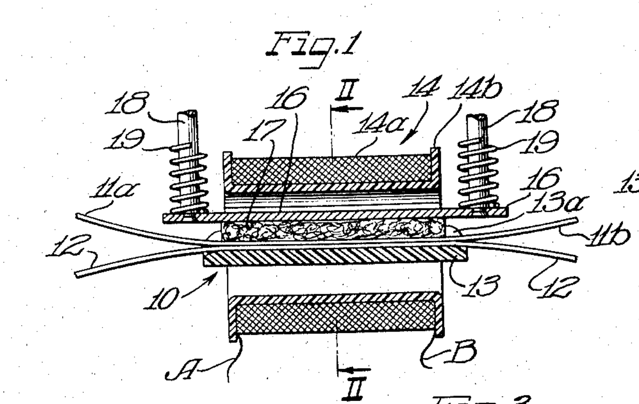
Figure 1 is a side sectionalized view of my duplicating device.
Figure 2:
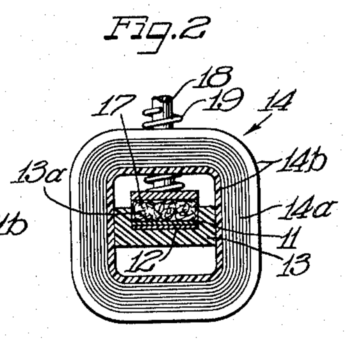
Figure 2 is an end cross-sectional view taken on line II—II of Figure 1.

Referring specifically to Figures 1 and 2, a magnetic sound recording duplicating device is indicated generally at 10 for transferring a magnetic pattern from a master magnetic record 12 to a magnetizable copy record 11. The magnetizable copy record medium is indicated as comprising a blank record portion **11*a* (before transfer) and a duplicate magnetic record portion 11*b*** (after transfer).

The duplicating device 10 preferably takes the form of a guide block 13 made of a non-magnetic material suitably shaped to define a record-guiding groove as at **13*a* and supported in an air core transfer solenoid indicated generally at 14. A reciprocable backing shoe 16 having affixed thereto a felt pressure pad 17 is positioned above the guide block 13**.

Using the planes of reference shown on the drawings, it should be noted that the master record 12 and the blank record **11*a* may be simultaneously drawn through the duplicating device 10 from left to right and are positioned between the pressure pad 17 and the guide block 13** as such passage occurs.

The backing shoe 16 may be reciprocated by a conventional spring-pressed structure for adjustable and resilient compression of the record media, thereby insuring that a good surface contact is maintained between the master record 12 and the blank record **11*a* while the record media are in the duplicating device 10**.

As shown in this embodiment, the backing shoe 16 is attached to a pair of support rods 18 which are surrounded by a pair of coil springs 19.

The air core transfer solenoid 14 is a conventional solenoid and comprises a winding **14*a* suitably disposed on a spool 14*b* made of non-magnetic material. Leading to and from the winding 14*a*** are the terminal leads designated A and B for connection with a source of electric current.

The record blank **11*a* and the master record 12 may be coiled around spools or other suitable supporting means from which they may be drawn through the duplicating device 10**, after which they are again suitably coiled and stored on a conventional form of driving mechanism having a powered or manually operated take-up reel. Inasmuch as the details of construction of this driving mechanism are not, per se, a part of the present invention, the mechanism is not shown or described in further detail.

The general operative steps comprising the method of my invention will be explained in connection with the diagrammatic representation shown on Figure 3. Structural details and material specifications as well as the characteristics of individual components will be set out with greater particularity in a subsequent portion of this description.

Figure 3:
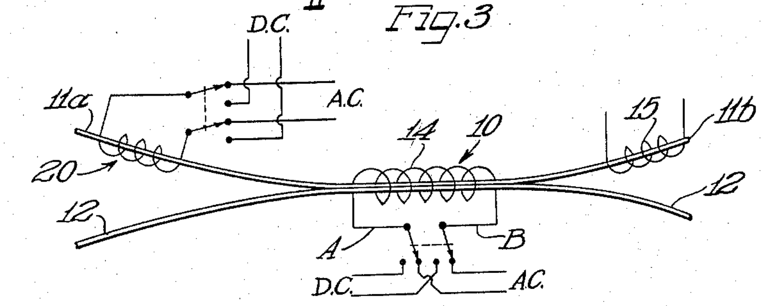
Figure 3 is a diagrammatic representation of the duplicating device shown on Figures 1 and 2 and illustrating the electric circuit.

As may be seen on Figure 3, an arrangement for producing duplicate magnetic recordings is indicated as comprising an eraser head 20, a master record 12, a blank record **11*a* and a duplicating device 10**.

The eraser head 20 is a conventional air core transfer solenoid and operates to remove magnetic variations from the blank record medium. The eraser head 20 may be energized by A.C. or D.C. current or may be equipped for selective energization with A.C. or D.C. current to establish a magnetic space field in the area of the solenoid air core.

The present invention relates to several distinct manners of operation, depending upon the type of electric current used in the various exciting elements. For the sake of convenience, these methods are referred to as the D.C. method, the A.C. method, and the combination method. The latter method inherently involves more than one permutation but is referred to in the singular for the sake of clarity and convenience.

When D.C. current is used, the eraser head 20 operates to induce in the record blank **11*a***, by means of a magnetic field, a condition of saturation. It is necessary to produce a condition of saturation in the record medium when the D.C. method is used for reasons which will become evident subsequently.

After the record blank **11*a* is placed in a condition of saturation, it is introduced into the duplicating device 10 in juxtaposition to the master record 12**.

The air core transfer solenoid 14 is energized by a D.C. excitation to produce a magnetic transfer field in the solenoid in opposition to the saturation of the blank record **11*a*. As shown on Figures 1 and 2, the blank record 11*a* is urged into firm contact with the master record 12 by the resilient coaction of the reciprocable pressure pad 17 and the guide block 13 thereby insuring that a close contact engagement of the record media is maintained as they pass through the magnetic transfer field produced in the solenoid 14. The vectorial summation of magnetic field components produces a modulation of the magnetization in the saturated record blank 11*a* which corresponds to the magnetic pattern established in master record 12, thereby producing a duplicate magnetic record 11*b* which is a faithful copy of the master record 12**.

It may be desirable to subject the magnetized copy record to an A.C. magnetic stabilizing field so as to "age" the copy record. This may be done within the A.C. magnetic field established by the stabilizer 15. The stabilizing field produced by head 15 in Figure 3 should be weaker than the transfer field to produce the desired stabilizing action.

When A.C. current is used, the eraser head 20 operates to demagnetize the record blank **11*a*** in a conventional manner with a decreasing A.C. field. It will be apparent that if the record medium is known to be free of magnetic variations, the erasure procedure may be omitted.

After erasure, the blank record **11*a* is introduced into the duplicating device 10 in justaposition to the master record 12**.

The air core transfer solenoid 14 is energized by an A.C. excitation to produce a magnetic transfer field and the record media are drawn through the field. As shown in Figures 1 and 2, the blank record **11*a* is urged into firm contact with the master record 12 by the resilient coaction of the reciprocable pressure pad 17 and the guide block 13, thereby insuring that a close contact engagement of the record media is maintained as they pass through the magnetic transfer field. The vectorial summation of the transfer field and master components results in a magnetization being imparted to the record blank 11*a* which corresponds to the magnetic pattern established in the master record 12, thereby producing a duplicate magnetic record 11*b* which is a faithful copy of the master record 12. The copy record may be stabilized in the magnetic field produced by the stabilizer 15**.

Instead of using a demagnetized copy medium when an A.C. excitation is used to produce a magnetic transfer field, it is also possible to use a copy medium which is saturated with a D.C. magnetization. The saturation magnetization produced in the copy medium is preferably induced by a magnetic field having its lines of force lying in a direction at right angles to the direction of the magnetic lines of force of the magnetization in the transferred record. It will, of course, be understood that various permutations whereby D.C. and A.C. combinations are employed in the erasure and transfer procedures are comprehended within the scope of the present invention and the preferred methods herein described are set forth in detail by way of explanation and not by way of limitation.

Figures 4, 5, 6:
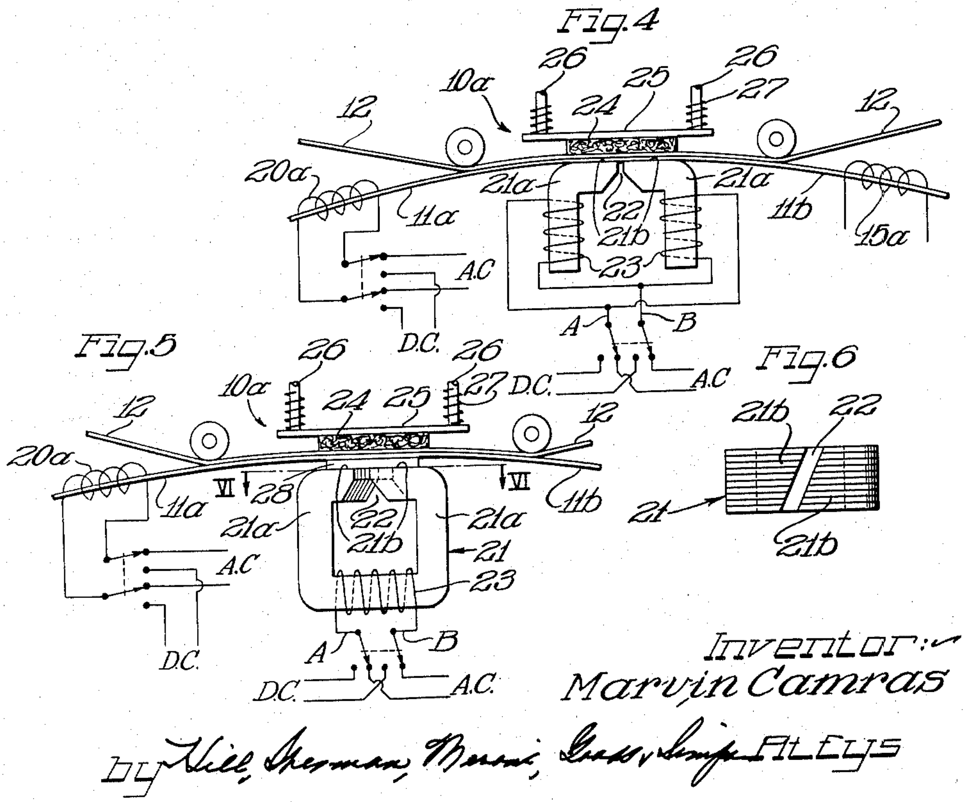
Figure 4 is a diagrammatic elevational view of an alternative embodiment of the magnetic recording duplicator.
Figure 5 shows a modification of the duplicator shown in Figure 4.
Figure 6 is a plan view of a modified form of the transfer segment taken on the line VI—VI of Figure 5.

Referring now to Figure 4, an alternative embodiment of my invention is indicated as comprising a duplicator device 10a having a transfer magnet 21 with a head portion 21b defined by a pair of opposing legs 21a which are separated by non-magnetic gap 22. A coil 23 is wound about the transfer magnet 21 and is connected with a source of electric current for selective excitation with A.C. or D.C. current. The transfer magnet 21 performs the function of establishing a magnetic field in and around the non-magnetic gap 22, and, therefore, is not intended to be limited by the precise form shown in the drawings. Thus, the transfer magnet 21 may comprise a closed core or a pair of separately wound legs as shown in Figure 5, and may include a laminated structure or solid structure. It may be noted that particularly advantageous results have been obtained in practice with the use of a powdered iron core. It may also be noted that the use of separately wound legs as shown in Figure 4 not only precludes short-circuiting of the lines of flux of the master record magnetization through the magnet 21 because of the high reluctance of the air space between the separated legs but actually tends to produce a concentration of the magnetic lines of flux from the master record in the copy medium at the area directly above the non-magnetic gap 22.

The duplicating device 10a may be operated in accordance with the various operation methods previously explained. Thus, as may be seen in Figure 4, after the record blank 11a is "erased" in the eraser head 20a, the master record 12 and duplicate record 11a are introduced into the magnetic field surrounding the air gap 22 produced by the excitation of coil 23 and are resiliently compressed for firm contact against the head portion 21b of magnet 21 by a spring press comprising a backing shoe 24 having affixed thereto a felt pressure pad 25 and reciprocated by a pair of rod supports 26 surrounded by a pair of coil springs 27. An additional A.C. stabilizing field for "aging" the magnetized copy medium may be established by the stabilizer 15a.

Figure 5 indicates how the duplicating device 10a may be further modified by interposing a spacer 28 between the head portion 21b and the felt pad 24 attached to the backing shoe 25. The spacer is preferably made of non-magnetic material and may take a special configuration, if desired, to improve its usefulness as a guide block.

Although the structure of the duplicating device 10a differs from the duplicating device 10 in that the former, upon excitation, establishes a magnetic transfer field in the area of an air gap while the latter establishes a magnetic transfer field in an air core, it will be apparent that the disposition of the magnetic lines of force in the two respective fields will lie in such a direction as to constitute essentially similar longitudinal magnetic fields.

For information dealing with the transfer of magnetic patterns from a master to a magnetizable copy with magnetic fields other than those fields having a longitudinal configuration, reference may be had to my copending applications, Serial No. 58,404, filed November 5, 1948, and Serial Nos. 60,652 and 60,653, both filed November 18, 1948.

It has been found in practice that in transferring magnetic patterns initially induced by a longitudinal recording field, especially favorable results have been attained with the use of a transfer magnet similar to the devices shown in Figures 4 and 5. The characteristics of this device will now be set out in detail.

Attention is invited to the peculiar structure of the head portion 21b of magnet 21. Referring particularly to Figure 6, it will be seen that the air gap 22 is formed to define an oblique angle with respect to the directional axis of the record media. It has been found that an oblique air gap produces operating characteristics which are greatly improved over the characteristics produced by a gap formed at right angles to the directional axis of the record media.

For example, with an oblique gap, a magnetic transfer field is produced having its magnetic lines of force in an angularly disposed configuration which conforms generally to the angle of incidence defined by the directional axis of the record media and the air gap. Thus, in the duplicating process, the additive effect of recording irregularities resulting from recording the master record in a normal magnetic field established in and around a perpendicularly transverse air gap of a recording transducer head is minimized, and a quieter duplicate record free of distortions may be produced. The obliquely cut air gap 22 also helps to avoid the production of an audible recording of the transfer frequency onto the record blank.

The width of the air gap 22 is preferably established so as to be approximately equal to one-half of the longest wave length of the intelligence to be transferred, or longer. It has been found that this dimension must be maintained to promote efficient transfer of a master magnetic pattern to a copy record material at lower frequencies.

Figure 7:
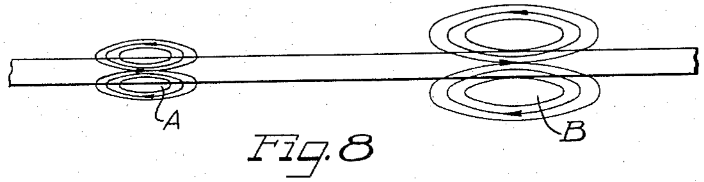
Figure 7 is a diagrammatic view of a section of a master magnetic record showing the relative diffusion of magnetic fields surrounding two specified points of magnetization having equal magnetic strength but varying as to the wave length of the intelligence recorded.

Some of the difficulties encountered in successfully producing duplicate magnetic records concern the interrelation of frequency and wave length. It is quite apparent that as the frequency of the signal being transferred becomes lower, the wave length of the intelligence to be transferred becomes longer and the external magnetic field surrounding the magnetic record medium becomes more diffuse. This phenomenon is depicted in the illustrative representation shown in Figure 7, where the relative strengths of two points of the same internal magnetization are set forth in pictorial fashion. It should be apparent that for the same value of residual magnetism in two points in a magnetized material, the field at point A having a shorter wave length is stronger than the field at point B which has a longer wave length.

Figure 8:
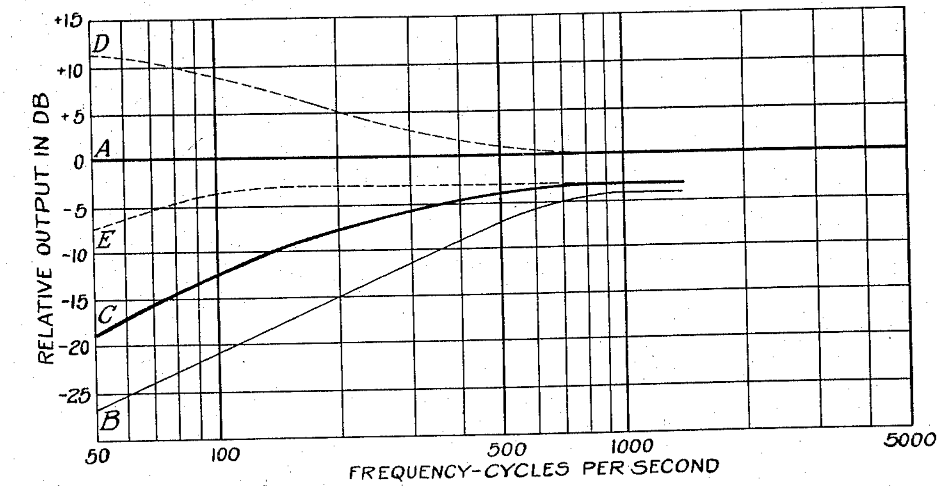
Figure 8 is a graph showing response curves of record media described in the instant disclosure.

Efficient low frequency transfer is affected by several factors including the construction features of the transfer magnet and the form and construction of the record media. Referring specifically to Figure 8, a graph is shown having frequency in cycles per second as its "X" coordinate and relative output in decibels as its "Y" coordinate.

As shown in Figure 8, the curve A represents the reference level, or frequency response of a given master record. Curve B represents the response of a copy record made with a transfer magnet having a short air gap less than one-half of the longest wave length of the intelligence transferred and with the master record next to the transfer magnet head. It will be noted that the relative output drops off rapidly as the frequency decreases.

Curve C represents the frequency response of a copy record made with a transfer magnet having an air gap approximately equal to one-half of the longest wave length of the intelligence transferred and with the copy material next to the transfer magnet head. It will be noted that the output at low frequencies is greatly improved.

As will be explained in greater detail subsequently, the structure of the master record may also be improved with respect to low frequency transfer efficiency. Thus, curve D represents the frequency response of a master record having an extra thick record layer or a master record which has been subjected to pre-equalization of low frequencies, or both.

The end result is shown by the curve E which shows the frequency response of a copy record made from the master record used to produce curve D and in connection with a transfer magnet having the corrected length of air gap. It will be noted that the frequency response curve of such a copy indicates a relatively uniform output at all frequencies in the desired range.

It has also been found that improved results are obtainable through the use of a spacer plate 28 as indicated in Figure 5, inasmuch as the record media can then be drawn, while in firm contact with one another, through a more desirable configuration of the longitudinal magnetic transfer field established in the area of the air gap 22. The spacer plate may be made of any suitable non-magnetic material but preferably takes the form of an easily replaceable, wear-resistant plate. Since the effective transfer field at the surface of the spacer plate is more widely diffused and more uniform with respect to the record media, a quieter record copy of greatly improved reproduction quality may be produced. It has also been found that the use of the spacer plate 28 greatly improves the low frequency response of the copy record because of the more favorable transfer field at the record tapes.

Reproduction characteristics of the copy medium may also be affected by altering certain other structural features of the transfer magnet. For example, it is possible to round off the corners of the air gap at the edges of the upper corners, whether the air gap be obliquely cut or perpendicularly transverse. Rounding the corners of the air gap has the effect of making the gap wider, and, therefore, affects the diffusion of the magnetic field. It has been found that improved reproduction characteristics may be obtained by using a gap with rounded corners instead of inserting an additional spacer plate 28. However, it may also be desirable to use a gap with rounded corners in addition to a spacer plate.

In following my novel method of transferring a magnetic pattern from a master to a magnetizable copy material, it is of considerable advantage to employ record media having certain specific characteristics.

For example, it has been customary in the art to use a multiplicity of types of magnetic media including coated tape and film, wire and solid metallic tape, however, I have found that my method of producing duplicate magnetic records may be successfully pursued with any of the various record media provided certain prerequisites are met and certain precautions are observed.

It is important to employ a master record having a high coercive force (preferably as high as 750-1,000 oersteds) so that the master will not be adversely affected by a high frequency A.C. transfer field.

The master record should also have a sufficiently high retentivity ($B_r$7 so as to permit a complete magnetization of the copy material. A representative value of $B_r$ would lie in the range of 1,500–5,000 gauss. The master record should, in addition, have a high $H_0$ value. An $H_0$ value is defined as the minimum value of field where retentivity is obtained.

Master records displaying these characteristics may be produced by using a desirable backing material capable of tolerating repeated mechanical abuse such as metal, nylon, cellulose acetate and any other material having good dimensional stability and tensile strength and coating such backing material with a binder paint containing a powder having a high coercive force. One such powder is known under the trade name of "Vectalite" and comprises, essentially, a mixture of ferric oxide, magnetite and cobaltic oxide.

The backing material should be thick enough so as to prevent transfer of the magnetic pattern upon adjoining layers when the master record is coiled, inasmuch as the high retentivity characteristics of the master are apt to make the master record relatively susceptible to transfer.

If a coating material is used in forming a master record, it has been found desirable to apply a thicker coating than is normally applied in making ordinary magnetic sound records inasmuch as a thicker coat tends to improve the low frequency response of the master record.

A solid tape master record having favorable characteristics may be produced by using an alloy of copper, cobalt and nickel. One such type is sometimes known commercially as "cunico." A solid type tape may take any desired width and, by way of example, may be about 0.002 inches in thickness. It may be desirable in practice to coat the solid type master record with a lacquer or the like as a safeguard against possible transfer when the tape is coiled upon itself as for storage purposes.

Before using the master record for producing duplicate records, it is highly desirable that the magnetized master record be subjected to an A.C. field equal in quantitative strength to that used in the A.C. transfer field plus the field induced into the copy material for the purpose of "aging." It has been found that this precautionary step stabilizes the characteristics of the master record and operates to prevent portions of the copy record from being retransferred to the master record in case relative slippage between the two record media occurs while the records are passing through the magnetic transfer field.

The copy material may take any desired form usually employed as magnetic record media but should have a sufficiently high coercive force and retentivity value ($B_r$) to give satisfactory output and frequency response when the finished duplicate record is played back on a magnetic record reproduction unit, however, the $H_c$ value of the copy material should be low enough so that the strength of the transfer field required will not approach the coercive force of the master record too closely. By way of generalization, it is desirable that the coercive force of the copy material be one-third to one-half that of the master record, or less. As a matter of practice, the $H_c$ of the copy material preferably lies in the range of 200-300 oersteds, although satisfactory results are obtainable with a much lower value of $H_c$ and excellent copy records have been made having a coercive force as high as 360 oersteds.

It is further preferable that the copy material be of low permeability so as to permit a high percentage of the magnetic field present in the master record to pass through the copy material when they are in intimate contact with one another within the magnetic transfer field.

The copy material should also have a high $H_c$ value with low retentivity at fields below the $H_c$ value so as to minimize the possible transfer of the magnetic pattern of the duplicate record after it has been magnetized and coiled up on a storage spool.

Although my method of transferring a magnetic pattern from a master record to a magnetizable copy record has been described in connection with the D.C. method, the A.C. method, and the combination method, the A.C. method probably affords inherently greater possibilities for variable control, as for example, is evidenced by the various types and qualities of magnetic transfer fields obtainable; however, in the A.C. method of duplication, it is preferable to use a high frequency magnetic transfer field. It has been found that the use of a high frequency field avoids the possibility of recording a sound corresponding to the A.C. frequency on the duplicate record, thereby producing an audible interference noise which greatly detracts from the utility of a sound recording.

It has also been found that the strength of the magnetic transfer field should lie at a value less than the $H_c$ value of the master, and preferably should lie at approximately one-half the value of the coercive force ($H_c$) of the master record medium or less. The field should also be higher than two-thirds the $H_c$ value of the copy medium and should preferably lie at a value between one and one-quarter to one and one-half times the coercive force ($H_c$) of the copy material. Higher values may be employed without producing deleterious results only under special conditions when non-slipping contact between the master and the copy is insured, until the field has decreased to below the value of approximately two-thirds the $H_c$ value of the copy material.

In order that the transfer processes be more clearly understood, particular reference may be had to the graphical information given in Figures 9, 10, 11, 12, 13, 14, 15 and 16.

Figure 9:
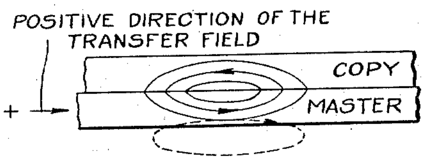
Figure 9 is a diagrammatic view of a cross section of a master magnetic record in contact with a copy material showing how the magnetization of the master permeates the copy.

Figure 9 shows the disposition of the magnetic lines of force in a typical master and copy when in contact with one another. Thus, if the transfer field lies in a positive direction as shown, the magnetization in the copy will lie in an opposite direction.

Figure 10:
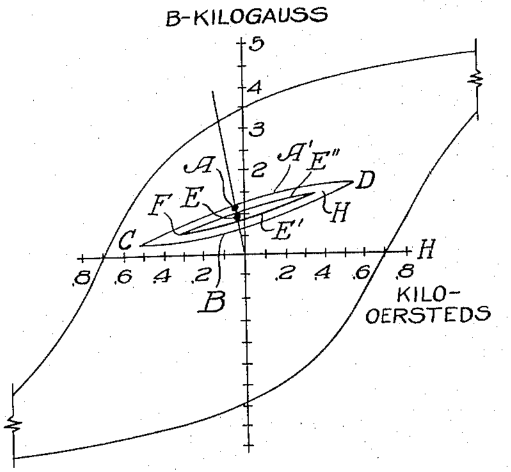
Figure 10 is a graph showing the hysteresis or magnetization curves of a typical master magnetic record.
Figure 11:
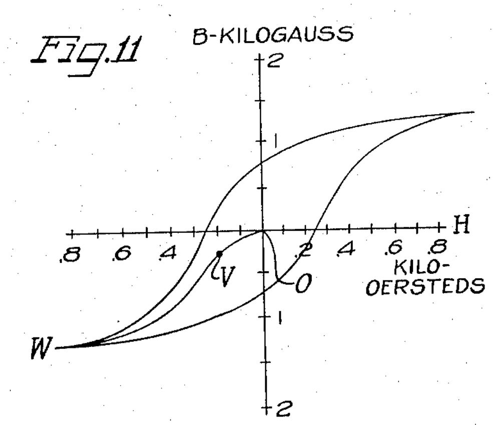
Figure 11 is a graph showing the hysteresis or magnetization curves of a typical copy material descrided in the present disclosure.

Referring specifically to Figures 10 and 11, magnetization curves are shown for a typical master record material and a copy material as defined and described in the instant disclosure.

By way of hypothesis, a magnetized spot on a master record is considered to have a specific magnetization which, when plotted on a graph with an "X" coordinate of coercive force measured in kilo-oersteds and a "Y" coordinate of retentivity measured in kilogauss, is represented by the point A (Figure 10). Since it is desirable that the master record be properly aged in a stabilizing magnetic field, the specific point under consideration during the aging process will follow a loop such as CBDA'C and will end up at a point such as E when the stabilizing field decays to zero over several cycles.

When the master record is placed in contact with the copy material, the locus of the magnetization of the master record may shift slightly to the right on the graph along the line EH.

Turning now to Figure 11, the magnetization of a similar spot of a copy material is originally at the zero point of the graphical coordinates if the copy material is demagnetized. When the master record is placed in contact with the copy material, the spot magnetization of the copy moves along the normal magnetization curve OW to a point such as V.

By way of illustration, it may be assumed that an A.C. transfer field of a strength of approximately 350 oersteds is applied to the contacted master record and copy material. The magnetization of the master will follow a path in the narrow loop E'HE''FE' (Figure 10) during the alternating cycles and will again end up in the region E when the transfer field decays to zero over several cycles.

Figure 12:
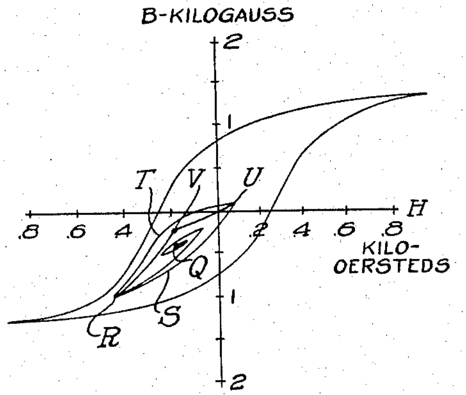
Figure 12 is a graph similar to the graph shown in Figure 11 but showing additional details of progressive steps.

Meanwhile, as may be seen in Figure 12, the A.C. transfer field causes the magnetization of the copy to swing from V to a path along a minor loop as UTRSU. When the transfer field decays to zero over several cycles, the magnetization of the copy will end up at a value such as Q.

Figure 13:
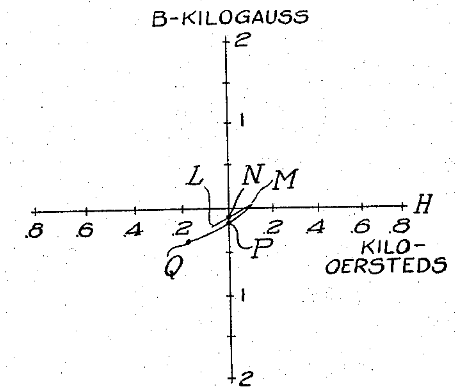
Figure 13 is a graph similar to the graph shown in Figure 11 but showing other details of progressive steps.

When the copy material—now a duplicate magnetic record—is separated from the master record, the field of magnetization of the copy drops from the point Q to a value such as P (Figure 13). At this stage of the transfer process, it may be desirable to subject the magnetized duplicate magnetic record to a stabilizing magnetic field. This is readily accomplished with the use of an additional decaying A.C. field. When subjected to this stabilizing field, the copy magnetization under consideration will cycle along the loop LM and will finally end up at the point N (Figure 13).

The residual magnetization in the copy material after the transfer process is linearly proportional to the magnetization of the master record so that a faithful duplicate magnetic record of low distortion is produced.

If a saturated copy medium is used or a D.C. magnetic transfer field is used, certain distinctive characteristics are present. Thus, referring specifically to Figure 14, a spot on a copy material may be considered which has an initial locus at the point 31. If the copy material is subjected to a saturation field in an erase head, or similar saturating head, the spot magnetization of the copy will be brought up to the point 32. After the copy material has left the saturation field, the spot magnetization drops to the point 33.

When the master record is placed in contact with the saturated copy material, the magnetization drops to the value shown at point 34. Assuming that a D.C. magnetic transfer field having a strength of approximately 325 to 350 oersteds is applied to the contacted master record and the saturated copy material, the copy magnetization will go from point 34 to the value shown at point 35.

After leaving the D.C. magnetic transfer field, the magnetization of the copy drops to 36, and when the copy material is finally separated from the master record, the magnetization will end up at the point 37. It should be understood, of course, that an A.C. stabilizing magnetic field may be used on the magnetized copy material if it is so desired.

It should be noted that if points or spots on the master record have a zero magnetization, the spot magnetization of the saturated copy will move from point 33 to point 38 when the D.C. transfer field is applied. When the copy material leaves the transfer field and is separated from the master record, the spot magnetization of the copy material moves to point 39, which for all practical purposes represents a zero magnetization.

Then again, if the magnetization of the master record lies in a direction opposite from the spot magnetization of the saturated copy material, the magnetization of the copy will move from point 33 to some value at 43 when the master record is placed in contact with the copy material. When the transfer field is applied, the spot magnetization of the copy moves to 40 from where it will move to 41 when the transfer field is removed. After the copy material is separated from the master record, the spot magnetization of the copy will move from point 41 to the value indicated at 42.

Thus, it should be apparent that the residual magnetization in the initially saturated copy material is linearly proportional to the magnetization of the master record, so that a faithful duplicate magnetic record of low distortion is produced.

Figures 14, 15:
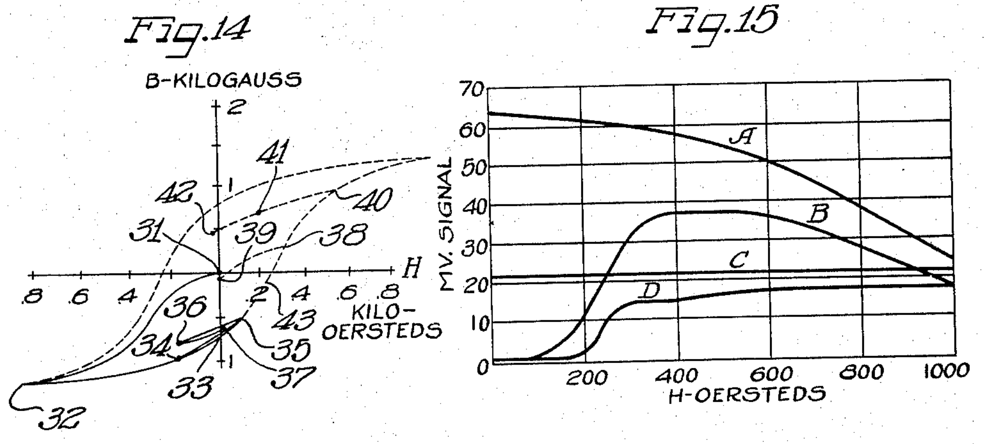
Figure 14 is a graph showing the magnetization curves of a saturated copy medium as it is subjected to the transfer process.
Figure 15 is a graph showing signal strength of magnetic records plotted against strength of magnetic transfer fields.

The effect of using transfer fields of varying strengths may be seen on the graph shown in Figure 15. The "X" coordinate of this graph is transfer field strength measured in oersteds, and the "Y" coordinate is the signal measured in millivolts.

Curve A (Figure 15) shows the signal output of a typical master record when it is subjected to a stabilizing field of the strength shown.

Curve B (Figure 15) represents the relative signal outputs of copy records made from the master record used in obtaining data for curve A (Figure 15) and shows how variations occur as different magnitudes of transfer field are employed.

Curve C (Figure 15) represents the signal output of a stabilized master record, and curve D (Figure 15) represents the signal outputs of typical duplicate copy records made from the master record used in obtaining data for curve C (Figure 15) showing how variations occur as transfer fields of different magnitude are employed.

Figure 16:
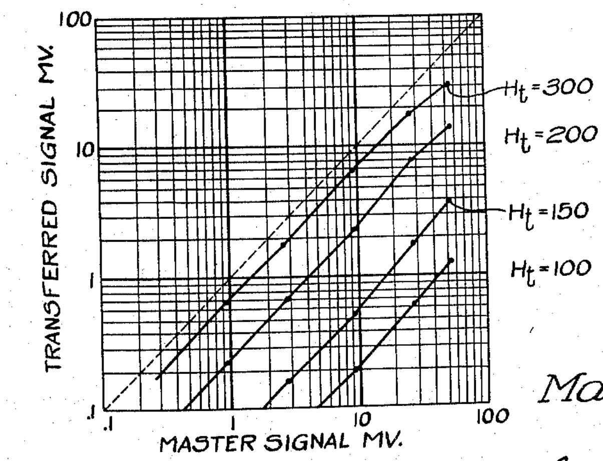
Figure 16 is a graph showing the proportional linearity between the residual magnetization of various copy records and the magnetization of a master magnetic record.

Figure 16 is made a part of this disclosure to demonstrate the proportional linearity between the master record and the duplicate copy record at different values of transfer field. The dashed curve represents a theoretical maximum as plotted on a log scale graph having as its "X" coordinate the master signal in millivolts, and as its "Y" coordinate, the transferred signal, also measured in millivolts. The individual curves are identified by their $H_t$ value, or in other words, the strength of the magnetic transfer field measured in oersteds. Thus, the curves are shown in connection with transfer fields of 300, 200, 150 and 100 oersteds, respectively. It should be evident that the individually plotted curves are straight lines spaced parallel to the theoretical maximum and are inclined at an angle of 45°. Therefore, it follows that a proportional linear relationship exists.

It may be noted at this point that a master record having the characteristics recommended in this description, properly aged and used in connection with and in the manner described will last indefinitely. The magnetic pattern existing in the master record will not deteriorate in quality despite repeated exposure to magnetic transfer fields during the duplicating operation.

It will be apparent to those skilled in the art that I have described a method whereby a predetermined magnetic pattern may be transferred from a master magnetic medium to a magnetizable copy material with great efficiency and rapidity thereby making possible the production of copy duplicates in an economical and convenient manner.

It will be understood that modifications and variations may be effected without departing from the scope of the novel concepts of the present invention.

I claim as my invention:

1. A magnetic transfer apparatus wherein a magnetic pattern is transferred from a master magnetic medium to a magnetizable copy medium comprising, in combination, excitation elements for producing a magnetic transfer field and means for placing said master medium in contact with said copy medium within said magnetic transfer field, said excitation elements including a transfer magnet defining a head portion containing a gap formed obliquely with respect to the directional axis of said master magnetic medium for establishing the transfer field.

2. A magnetic transfer apparatus wherein a magnetic pattern is transferred from a master magnetic medium to a magnetizable copy medium comprising, in combination, excitation elements for producing a magnetic transfer field and an adjustable spring press for placing said master medium in contact with said copy medium within said magnetic transfer field, said excitation elements including a transfer magnet defining a head portion containing an air gap formed obliquely with respect to the directional axis of said master magnetic medium, said spring press having a reciprocable spring-loaded padded backing shoe for resiliently pressing said record media against said head portion of said transfer magnet.

3. A magnetic transfer apparatus wherein a magnetic pattern is transferred from a master magnetic medium to a magnetizable copy medium comprising, in combination, excitation elements for producing a magnetic transfer field and an adjustable spring press for placing said master medium in contact with said copy medium within said magnetic transfer field, said excitation elements including a transfer magnet defining a head portion containing an air gap formed obliquely with respect to the directional axis of said master magnetic medium and having a non-magnetic spacer bar affixed to said head portion, and said spring press having a reciprocable spring-loaded padded backing shoe for resiliently pressing said record media against said spacer bar.

4. A magnetic transfer apparatus wherein a magnetic pattern is transferred from a master magnetic medium to a magnetizable copy medium comprising, in combination, excitation elements for producing a magnetic transfer field and an adjustable spring press for placing said master medium in contact with said copy medium within said magnetic transfer field, said excitation elements including a transfer magnet defining a head portion containing an air gap formed obliquely with respect to the directional axis of said master magnetic medium for excitation with electric current, said air gap being of a width approximately equal to one-half of the longest wave length of an intelligence pattern to be transferred from said master medium to said copy medium, the frequencies to be transferred lying between about 50 and 1300 cycles per second.

5. A magnetic transfer apparatus wherein a magnetic pattern is transferred from a master magnetic medium to a magnetizable copy medium comprising, in combination, excitation elements for producing a magnetic transfer field and an adjustable spring press for placing said master medium in contact with said copy medium within said magnetic transfer field, said excitation elements including a transfer magnet defining a head portion containing an air gap for excitation with electric current, said air gap being of a width approximately equal to one-half of the longest wave length of an intelligence pattern to be transferred from said master medium to said copy medium, the frequencies to be transferred from the master medium to the copy medium lying between about 50 and 1300 cycles per second.

6. In a magnetic transfer apparatus wherein a magnetic pattern is transferred from a master magnetic medium to a magnetizable copy medium, a transfer magnet defining a head portion with an obliquely cut air gap, said air gap being of a width approximately equal to one-half of the longest wave length of an intelligence pattern to be transferred from said master medium to said copy medium, the frequency components to be transferred from the master medium to the copy medium lying between about 50 and 1300 cycles per second.

7. In a magnetic transfer apparatus wherein a magnetic pattern is transferred from a master magnetic medium to a magnetizable copy medium, a transfer magnet defining a head portion with an air gap, said air gap being of a width approximately equal to one-half of the longest wave length of an intelligence pattern to be transferred from said master medium to said copy medium, and means comprising said transfer magnet for producing a magnetic transfer field for causing the transfer of a magnetic pattern from said master magnetic medium to said magnetizable copy medium, the lowest frequency being transferred from the master medium to the copy medium being about 50 cycles per second.

8. As an article of manufacture, a transfer magnet adapted for use in producing duplicate magnetic records, said transfer magnet including a head member and exciting elements for producing a magnetic transfer field in and around said head member, said head member defining a non-magnetic gap of a width more than one-half as long as the longest wave length of an intelligence being transferred within said magnetic transfer field whereby said magnetic transfer field may be established in and around said gap, and means comprising said transfer magnet for producing magnetization of the duplicate magnetic record in accordance with the magnetization of a master record within said magnetic transfer field.

9. As an article of manufacture, a transfer magnet adapted for use in producing duplicate magnetic records, said transfer magnet including a head member and exciting elements for producing a magnetic transfer field in and around said head member, said head member defining a non-magnetic gap of a width more than one-half as long as the longest wave length of an intelligence being transferred within said magnetic transfer field whereby said magnetic transfer field may be established in and around said gap, the frequency component transferred within said magnetic transfer field lying between about 50 cycles per second and 1300 cycles per second, said transfer magnet further including a non-magnetic spacer plate for placing record media in a more favorable portion of said magnetic transfer field.

10. As an article of manufacture, a transfer magnet adapted for use in producing duplicate magnetic records, said transfer magnet including a pair of legs having adjacent ends separated by a non-magnetic gap and having opposite ends spaced apart a distance many times greater than said adjacent ends, and exciting elements associated with said legs for producing a magnetic transfer field in and around said gap, and means comprising said transfer magnet for producing magnetization of duplicate magnetic records in accordance with the magnetization of a master record within said magnetic transfer field.

11. As an article of manufacture, a transfer magnet adapted for use in producing duplicate magnetic records, said transfer magnet including a pair of legs having adjacent ends separated by a non-magnetic gap and having opposite ends spaced apart a distance many times greater than said adjacent ends to provide a high magnetic reluctance circuit between said opposite ends, and exciting elements associated with said legs for producing a magnetic transfer field in and around said gap, said transfer magnet further including a spacer plate mounted on said legs and overlying both said adjacent ends of said legs for placing record media in a more favorable portion of said magnetic transfer field.

12. As an article of manufacture, a transfer magnet adapted for use in producing duplicate magnetic records, said transfer magnet including a pair of legs separated by a non-magnetic gap and exciting elements associated with said legs for producing a magnetic transfer field in and around said gap, said transfer magnet further including a spacer plate mounted on said legs for placing record media in a more favorable portion of said magnetic transfer field, said non-magnetic gap being of a width more than one-half as long as the longest wave length of an intelligence being transferred, the longest wavelength corresponding to a frequency of about 50 cycles per second.

13. Magnetic transfer apparatus comprising head means for producing a magnetic transfer field, a master record and copy record disposed within the influence of the transfer field and in contact with each other, said head means including a permeable core defining a relatively small magnetic gap in the vicinity of said records and having a relatively large gap in series magnetic circuit with said relatively small magnetic gap of extent many times greater than the extent of said relatively small gap and providing additional relatively high reluctance in the magnetic core circuit in a core region remote from said records.

14. In combination, a magnetic record medium having a residual magnetization thereon with the lines of force of said magnetization extending longitudinally of the direction of travel of the record medium, a magnetic head cooperating with said record medium and having a non-magnetic gap disposed at an acute angle with respect to the direction of travel of the record medium, and means comprising said magnetic head for producing magnetization of a copy record medium in contact with said record medium having the residual magnetization thereon.

15. In combination, means for defining a path of travel of a magnetic record medium, magnetic head means for cooperation with said record medium comprising means defining a non-magnetic gap disposed at an acute angle with respect to the direction of said path of travel, and means comprising said magnetic head means for producing magnetization of a magnetic record medium.

16. In combination, a magnetic record medium having a residual magnetization pattern thereon with the lines of force of said magnetization pattern extending at a first angle with respect to the direction of travel of the record medium, a magnetic head cooperating with said record medium and having a non-magnetic gap disposed at a second angle to define lines of force extending at a substantially different angle from said first angle, and means comprising said magnetic head for producing magnetization of a magnetic record medium.

17. In combination, means defining a path of travel for a magnetic record medium, magnetic head means along said path for cooperation with said magnetic record medium including a pair of poles defining a non-magnetic gap, spacer means overlying both said poles and interposed between said gap and said path, and means comprising the thickness of said spacer means for placing the record medium in a substantially more diffuse field than that immediately adjacent said gap.

18. In combination, means defining a path of travel for a magnetic recond medium, magnetic head means along said path for cooperation with the magnetic record medium including poles defining a non-magnetic gap, spacer means mounted on said head means and spanning said gap and disposed with a surface thereof remote from said gap extending along and defining a portion of said path of travel of said record medium substantially above both of said poles and equally spaced above each of said poles, and means comprising the height of said surface above said poles which at least approximates the gap width between the poles for placing said record medium in a substantially more diffuse magnetic field than that at the level of the pole surfaces above said gap.

19. A magnetic head comprising a pair of legs of magnetic material having adjacent ends defining a non-magnetic gap for coupling to a magnetic record medium and having opposite ends disposed in spaced relation and magnetically separated a distance substantially greater than said adjacent ends and having a non-magnetic space therebetween to provide a magnetic reluctance between said opposite ends many times greater than the magnetic reluctance between said adjacent ends, and means comprising said legs for producing a magnetic transfer field for transferring magnetization from a master record medium to a copy magnetic record medium.

20. A magnetic transfer apparatus wherein a magnetic pattern is transferred from a master magnetic medium to a magnetizable copy medium comprising, in combination, means for producing a magnetic transfer field, means for placing said master medium in contact with said copy medium within said magnetic transfer field, said producing means including a transfer magnet defining a head portion containing a non-magnetic gap, a non-magnetic spacer bar affixed to said head portion, and means for resiliently pressing said record media against said spacer bar.

References Cited in the file of this patent

UNITED STATES PATENTS

| | | |
|---|---|---|
| 2,230,913 | Shuller | Feb. 4, 1941 |
| 2,483,123 | Clapp | Sept. 27, 1949 |
| 2,543,483 | Barrett | Feb. 27, 1951 |
| 2,546,927 | Howell | Mar. 27, 1951 |
| 2,585,932 | Hare | Feb. 19, 1952 |
| 2,653,189 | Camras | Sept. 22, 1953 |
| 2,738,383 | Herr et al. | Mar. 13, 1956 |

FOREIGN PATENTS

| | | |
|---|---|---|
| 617,796 | Germany | Nov. 26, 1932 |
| 801,698 | France | May 23, 1936 |
| 728,719 | Germany | Dec. 3, 1942 |